P. J. ROACH.
OVERSHOE FOR HORSES.
APPLICATION FILED JAN. 2, 1912. RENEWED DEC. 21, 1912.

1,053,064.

Patented Feb. 11, 1913.

UNITED STATES PATENT OFFICE.

PATRICK J. ROACH, OF TORONTO, ONTARIO, CANADA.

OVERSHOE FOR HORSES.

1,053,064.        Specification of Letters Patent.        Patented Feb. 11, 1913.

Application filed January 2, 1912, Serial No. 669,069. Renewed December 21, 1912. Serial No. 738,078.

*To all whom it may concern:*

Be it known that I, PATRICK J. ROACH, of the city of Toronto, in the county of York and Province of Ontario, Dominion of Canada, have invented certain new and useful Improvements in Overshoes for Horses; and I hereby declare that the following is a full, clear, and exact description of the same.

My invention relates to an overshoe for horses which will prevent the slipping of the hoof on the pavement.

The object of my invention is to devise an overshoe whose function is to prevent the slipping of the hoof on the pavement and to so arrange the parts of the overshoe that they cannot be presented to or pressed against the sole or frog of the hoof during the ordinary use of the overshoe.

In carrying out this object, I use a connecting member in juxtaposition to the inner edge of the horseshoe and conforming thereto, and I attach to this connecting member a plural number of flexible links which, when the overshoe is placed on the hoof, extend across the tread of the horseshoe from its inner to its outer edge, so as to leave that part of the hoof within the inner edge of the horseshoe, unexposed to any part of the overshoe.

To maintain the flexible links correctly positioned below the tread of the horseshoe, I employ a complemental member to embrace the crown of the hoof, and I attach the outer ends of the flexible links to the complemental member by supporting links which readily permit of the accurate adjustment of the overshoe on the hoof, and I secure the overshoe in its adjusted position by fastening together the ends of the complemental member and the ends of the connecting member.

Figure 1:
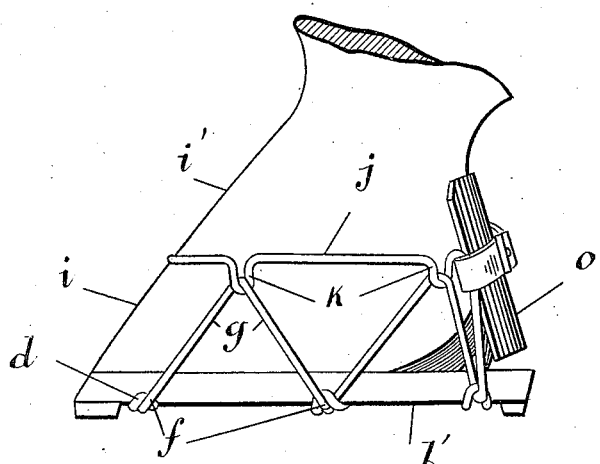
Figure 2:
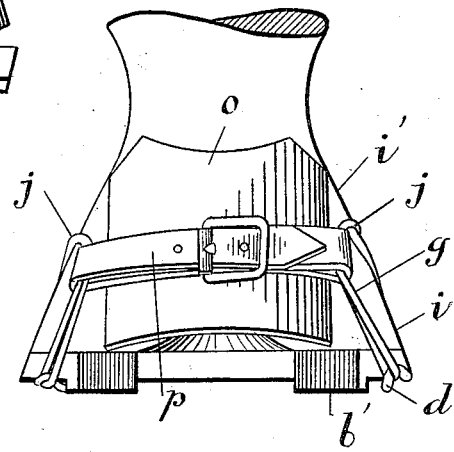

For an understanding of my invention, reference is to be had to the following description and to the accompanying drawings, in which:

Figure 1, is a perspective view of a hoof, with an overshoe fitted thereon, looking at the side. Fig. 2, is a similar view to Fig. 1, looking at the heel, and Fig. 3, is an inverted plan view of the hoof and overshoe.

Like characters of reference refer to like parts throughout the specification and drawings.

In the construction of the overshoe, I use a connecting element $a$, to be placed in juxtaposition to the inner edge $b$ of the horseshoe $b'$ and conform thereto, and I provide the ends of the connecting element $a$ with interlocking hooks $c$ or other fastening means, whereby the ends of the connecting element can be separably fastened together when the overshoe is adjusted on the hoof. For the flexible attachment of the anti-slipping links $d$ to the connecting element $a$, I provide the latter with a plural number of retaining loops or eyes $e$, to which the inner ends of the anti-slipping links are yieldably secured and maintained in their fixed positions. These anti-slipping links extend across the tread of the horseshoe $b'$ from its inner edge $b$ to its outer edge $b''$, and the outer ends of the anti-slipping links are yieldably attached to corresponding retaining loops or eyes $f$ formed on the supporting links $g$, which embrace the surface of the hoof $i$ interjacent its crown $i'$ and the tread of the horseshoe $b'$. By thus attaching the anti-slipping links to the supporting links $g$, I am able to maintain them in their fixed position with relation to the tread of the horseshoe $b'$ and yet permit of a slight yielding movement to prevent continuous wear on the same part of the links.

Figure 3:
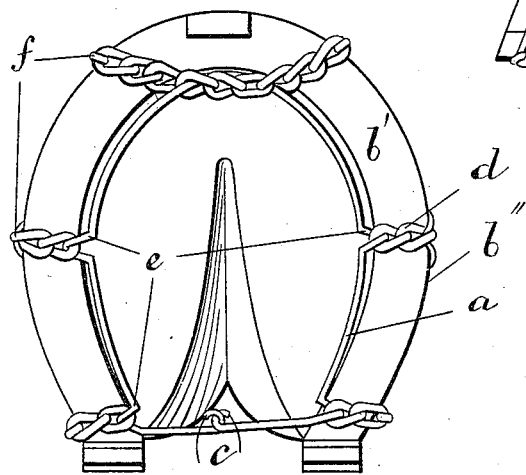

As shown in Fig. 3, the connecting element $a$ is in juxtaposition with the inner edge of the horseshoe so that the anti-slipping links $d$ will lie wholly and evenly across its tread and leave the sole $h$ and frog $h'$ of the hoof unexposed to contact with any of the parts of the overshoe. Embracing the crown of the hoof is a complemental element $j$ provided with a series of loops or eyes $k$, to which are flexibly attached the upper ends of the supporting links $g$.

In fitting the overshoe on the hoof, the connecting element $a$ is adjusted to the inner edge $b$ of the horseshoe $b'$, and the supporting links $g$ are adjusted to the surface of the hoof $i$, so that the anti-slipping links $d$ will lie wholly and evenly across the tread of the horseshoe; the complemental element $j$ embracing the crown of the hoof at the limits provided by the supporting links $g$ with a pad $o$ placed across the heel of the hoof to protect it from injury by the ends of the complemental element $j$ and the supporting links $g$.

To secure the overshoe in its adjusted position on the hoof, the ends $c$ of the connecting element *a* are interlocked, and a draw strap *p* is employed to fasten the ends of the complemental element *j* together, the fastening of the ends of the complemental element effecting the fastening of the supporting links in their adjusted position on the hoof.

As shown in Fig. 3, none of the parts of the overshoe extend within the boundary of the inner edge *b* of the tread of the horseshoe, and consequently no part of the sole or the frog of the hoof is exposed to injury therefrom when the hoof is placed on the pavement and its weight is on the overshoe. This is a radical improvement in the construction of overshoes of this character, and is of material advantage, inasmuch as the overshoe cannot injure the hoof during its ordinary use.

By means of my construction, I am able to obtain all the advantages of an anti-slipping overshoe without any risk of injury to the hoof.

Having thus fully described the nature of my invention, what I claim as new and desire to secure by Letters Patent, is:

1. An overshoe for horses comprising a substantially U-shaped connecting element conforming to the inner edge of a horseshoe and formed with a plural number of laterally projecting loops, anti-slipping elements having their inner ends yieldingly held by their respective loops and maintained thereby in their fixed positions with respect to each other to lie transversely across the tread of the horseshoe from the connecting element to the outer edge of the hoof, a complemental member embracing the hoof, said complemental member being formed with downwardly projecting loops corresponding in number and relative location with those of the connecting element, and flexible links connected to the loops of the complemental member and the outer ends of the anti-slipping elements and maintaining the outer ends of the anti-slipping elements in their fixed positions relatively to each other.

2. An overshoe for horses comprising a substantially U-shaped connecting element conforming to the inner edge of a horseshoe and formed with a plurality of laterally projecting loops, anti-slipping elements with their inner ends yieldingly held by their respective loops and thereby maintained in their fixed position with respect to each other and transversely across the tread of the horseshoe, a complemental member embracing the hoof and formed with downwardly projecting loops corresponding in number and relative location with those of the connecting element, flexible links connecting the loops of said complemental member with the outer ends of the anti-slipping elements, fastening means extending between the ends of said connecting element below the heel of the hoof and behind the frog, a draw strap to separably fasten the ends of the complemental member together, and a pad between said draw strap and the back of the hoof, for the purpose of preventing injury to the hoof.

Toronto, November 29th, 1911.

PATRICK J. ROACH.

Signed in the presence of—
EDWARD BERNSTEIN,
CHAS. H. RICHES.

---

Copies of this patent may be obtained for five cents each, by addressing the "Commissioner of Patents, Washington, D. C."